(12) United States Patent
Linde

(10) Patent No.: US 10,060,719 B2
(45) Date of Patent: Aug. 28, 2018

(54) SYSTEM AND METHOD FOR MEASURING THE RELATIVE POSITIONS OF ROTARY COMPONENTS

(71) Applicant: Acoem AB, Molndal (SE)

(72) Inventor: Petter Linde, Savedalen (SE)

(73) Assignee: Acoem AB, Molndal (SE)

( * ) Notice: Subject to any disclaimer, the term of this patent is extended or adjusted under 35 U.S.C. 154(b) by 0 days.

(21) Appl. No.: 14/439,828

(22) PCT Filed: Nov. 13, 2013

(86) PCT No.: PCT/SE2013/051336
§ 371 (c)(1),
(2) Date: Apr. 30, 2015

(87) PCT Pub. No.: WO2014/077767
PCT Pub. Date: May 22, 2014

(65) Prior Publication Data
US 2015/0300802 A1    Oct. 22, 2015

(30) Foreign Application Priority Data

Nov. 13, 2012  (SE) ...................................... 1251288

(51) Int. Cl.
*G01B 7/31* (2006.01)
*G01B 11/27* (2006.01)

(52) U.S. Cl.
CPC .............. *G01B 7/31* (2013.01); *G01B 11/272* (2013.01)

(58) Field of Classification Search
CPC ................................ G01B 7/31; G01B 11/272
USPC .......... 73/494, 115.01, 865.8, 865.9; 33/286, 33/412, 533, 645
See application file for complete search history.

(56) References Cited

U.S. PATENT DOCUMENTS

| | | | | |
|---|---|---|---|---|
| 3,192,631 A | * | 7/1965 | Goguen ................. | G01B 11/27 33/278 |
| 4,698,491 A | * | 10/1987 | Lysen .................. | G01B 11/272 250/559.3 |
| 6,223,102 B1 | * | 4/2001 | Busch .................. | G01B 11/272 33/645 |

(Continued)

FOREIGN PATENT DOCUMENTS

| | | |
|---|---|---|
| DE | 10138831 A1 | 2/2003 |
| DE | 102006015461 A1 | 11/2006 |
| EP | 2592380 A2 | 5/2013 |

OTHER PUBLICATIONS

International Search Report corresponding to International Application No. PCT/SE2013/051336, dated Mar. 20, 2014.

*Primary Examiner* — Robert R Raevis
(74) *Attorney, Agent, or Firm* — Renner Otto Boisselle and Sklar

(57) ABSTRACT

The invention relates to a measuring system for measuring the relative positions of a first rotary component and a second rotary component relative to each other, comprising a first measuring unit adapted for mounting on the first rotary component, and a second measuring unit adapted for mounting on the second rotary component, wherein at least one of said measuring units comprises a detector unit for determining the positions of said rotary components. According to the invention, at least one of said measuring units comprises a gyro for detecting the current angular position of said measuring unit at rotation of said rotary components.

19 Claims, 3 Drawing Sheets

(56) References Cited

U.S. PATENT DOCUMENTS

| | | | | |
|---|---|---|---|---|
| 6,356,348 B1* | 3/2002 | Lysen | .................... | G01S 5/163 |
| | | | | 250/208.2 |
| 6,725,723 B2* | 4/2004 | Aronsson | ............. | G01D 18/008 |
| | | | | 702/56 |
| 6,931,738 B2* | 8/2005 | Bodgren | ................ | F02B 67/06 |
| | | | | 33/286 |
| 6,968,625 B2* | 11/2005 | Segerstrom | .......... | G01B 11/272 |
| | | | | 33/286 |
| 7,100,289 B1* | 9/2006 | Strege | .................... | G01B 7/315 |
| | | | | 33/203 |
| 7,301,616 B2* | 11/2007 | Foley | .................. | G01B 11/272 |
| | | | | 356/141.3 |
| 7,460,977 B2* | 12/2008 | Stromberg | ........... | G01B 11/272 |
| | | | | 227/15 |
| 7,711,519 B2* | 5/2010 | Lindberg | ............... | G01H 1/003 |
| | | | | 702/183 |
| 8,037,615 B2* | 10/2011 | Glaser | ................ | G01B 11/272 |
| | | | | 33/286 |
| 8,607,635 B2* | 12/2013 | Busch | ................ | G01B 11/272 |
| | | | | 73/655 |
| 2002/0024674 A1 | 2/2002 | Albrecht et al. | | |
| 2004/0252302 A1* | 12/2004 | Henry | .................. | G01B 11/272 |
| | | | | 356/400 |
| 2008/0186491 A1* | 8/2008 | Baxter | .................... | G01D 5/38 |
| | | | | 356/364 |
| 2008/0201097 A1* | 8/2008 | Stromberg | .......... | G01B 11/272 |
| | | | | 702/94 |
| 2011/0113888 A1* | 5/2011 | Busch | ................ | G01B 11/272 |
| | | | | 73/655 |

* cited by examiner

SYSTEM AND METHOD FOR MEASURING THE RELATIVE POSITIONS OF ROTARY COMPONENTS

TECHNICAL FIELD

The present invention relates to a measuring system for measuring the relative positions of a first rotary component and a second rotary component relative to each other, comprising a first measuring unit arranged for mounting on the first rotary component, and a second measuring unit arranged for mounting on the second rotary component; wherein at least one of said measuring units comprises a detector unit for determining the positions of said rotary components. The invention also relates to a method of measuring the relative positions of a first component and a second component relative to each other, the method comprising the steps: mounting of a first measuring unit on a first rotary component; and mounting of a second measuring unit on a second rotary component, at least one of said measuring units comprising a detector unit for determining the positions of said rotary components.

TECHNICAL BACKGROUND

In several technical fields there is a need for correct alignment of various components and machines relative to each other. In operation of, for example, large motors, pumps, and similar equipment it is necessary that a first rotary component, such as an output shaft, of a driving unit, in the form of, for example, a motor is aligned correctly with respect to a second rotary component, such as an input shaft, of a driven unit in the form of, for example, a pump. In this way, the output power of the motor can be transmitted via the rotational movement of the motor shaft to the input shaft of the pump in an optimal manner. Any misalignment between the two shafts can result in poor efficiency and increased risk of wear and damage to the motor and the pump.

In the above-mentioned technical field, there is consequently a requirement for correct alignment of the output shaft of the motor relative to the input shaft of the pump. It should be noted in this respect that the two shafts can give rise to alignment errors of generally two different kinds. More specifically, the shafts may be arranged with a specific angle relative to each other, which is called angular error, i.e. a "horizontal angular error" and a "vertical angular error". Secondly, even if the shafts are parallel to one another they might be somewhat offset relative to each other so as to extend along two separate directions, i.e. in parallel. This is called "horizontal offset" and "vertical offset". If these errors exceed predetermined threshold values, one can assume that the shafts, and their associated machines, are poorly aligned relative to each other. Their positions must then be adjusted so that a more optimal alignment is achieved.

Thus, there is a general need for systems and methods of aligning various machine units comprising rotary shafts. Such systems and methods can be used for motors, pumps, and similar equipment. Generally, they can be used in power plants, chemical industries, and oil refineries, especially in applications that include high speed, or in applications that include expensive process critical machines which must be aligned.

According to the prior art, described in, for example, SE 524 366 and U.S. Pat. No. 4,518,855, an alignment of two rotary shafts of two machines can be carried out by means of measuring apparatus comprising a first measuring unit arranged for mounting on a first machine and comprising a light source for generating radiation of light in the direction towards a second measuring unit arranged for mounting on a second machine, and also comprising a second light source for generating radiation of light in the direction towards the first measuring unit. Furthermore, each of the measuring units comprises a detection unit for emitted radiation of light. By means of this apparatus, the alignment of the two shafts of the machines can be checked.

The alignment of the components or the machines can be set manually by a user; usually a technician. This has led to a demand for systems which can compute angular errors and offset errors and reproduce these values and the position of the components in a simple and clear manner.

According to prior, traditional art, an alignment of rotary components—e.g. in the form of rotary shafts—could be effected by coupling the components and then placing them together in specific predetermined angular positions along a turn, more specifically in all or some of the angular positions corresponding to 0°, 90°, 270°, and 180° along the turn. This approach was called the "clock method". Setting out from the measured angular errors and offset errors in respective angular positions, the relative positions of the components could be determined.

It was a disadvantage of the above-mentioned method that it is not always possible as regards all types of machines and the like facilities to position the rotary components, and their measuring units, in all of the above-mentioned angular positions. For example, there may be machine setups where any additional machine part or the like is in the way and prevents the shafts from being set in any of these angular positions. For this reason, the above traditional technology can be complemented with the use of a so-called inclinometer, i.e. an angle meter, which is used for measuring the current angular position of shaft and associated measuring unit, respectively. By this method, it is possible to make use of, in principle, arbitrary angular positions for shaft and measuring unit, respectively, in the alignment. Respective, set angular positions can be measured and are then used for the computations of angular errors and offset errors.

Furthermore, according to the prior art use has also been made of a display unit, comprising inter alia control unit and display connected to the measuring units. In this solution, the control unit receives the values from the measuring units, and then computes the alignment of the components via angular errors and offset errors. These values are reproduced by the display unit via the display as numerical values and graphical information of the components. Icons and indicators showing how the components should be moved and how their position should be adjusted in the alignment can be shown on the display for the convenience of the user.

The above type of measuring equipment is primarily intended to be used when the relevant machines are horizontally oriented, i.e. when the rotary input shafts are arranged along a common horizontal plane.

It should be noted, however, that for many applications the machines are vertically oriented. Hence, there is a need for measuring equipment which has such flexibility as to be usable both for horizontally and vertically aligned components. Analogously herewith, there is a need for measuring equipment which comprises display units which are also adapted for graphical representation of data and images, which can be applied to both horizontally and vertically arranged setups of machines and the like units. It is otherwise difficult for the user to identify the values which according to the display need to be changed as the graphical information on the display and the setup of the physical components are not always consistent.

Thus, it can be established that there is a need for more flexible approaches of aligning rotary components, particularly of aligning setups which are not necessarily horizontally arranged. There is also a market need for increased user friendliness and a clearer representation of the components on the display of a display unit for alignment of shaft driven machines.

DESCRIPTION OF THE INVENTION

The present invention relates to a system and a method of measuring the relative positions of a first rotary component and a second rotary component relative to each other, comprising a first measuring unit adapted for mounting on the first rotary component, and a second measuring unit adapted for mounting on the second rotary component; wherein at least one of said measuring units comprises a detector unit for determining the positions of said rotary components.

It is an object of the present invention to provide a measuring system by means of which an improved and in particular more flexible measuring and alignment of the relative positions of two components can be performed. In particular, it is an object to make possible a correct measuring essentially irrespective of the orientation of the first and the second component, respectively, i.e. irrespective of whether the components are oriented along e.g. an essentially horizontal direction or an essentially vertical direction. It is a particular object to provide a measuring system which provides improved graphical information reflecting the setup of the physical components relative to the user in a clearer manner than known solutions.

This object is achieved with a measuring system in which at least one of said measuring units comprises a gyro for detecting the current angular position of said measuring unit at rotation of said rotary components.

According to one embodiment, the invention is arranged such that at least one of said measuring units comprises an accelerometer adapted for detecting the current angular position at rotation of said rotary components when they are arranged with essentially horizontal orientation, and that the gyro is adapted for detecting the current angular position at rotation of said rotary components when they are arranged with essentially vertical orientation. Hence, the invention can be used flexibly for measuring arrangements with rotary components with both horizontal and vertical orientation.

According to one embodiment, the invention is arranged such that at least one of said measuring unit comprises an accelerometer adapted for detecting whether said rotary components are arranged with horizontal or vertical orientation. With information on the current orientation of the rotary components at a given time, the system can e.g. adapt graphical information which is presented on a display unit and which is used during the measuring.

Furthermore, the invention can be arranged such that at least one of said measuring units comprises both a gyro and an accelerometer which are adapted for detecting the current angular position at rotation of said rotary components when they are arranged with essentially horizontal orientation. By using information from both an accelerometer and from a gyro, when measuring with the rotary components arranged horizontally, a system is obtained having high measuring accuracy.

Furthermore, according to the invention there is described a method of measuring the relative positions of a first component and a second component relative to each other, the method comprising the steps: rotation of said rotary components for setting said rotary components in a plurality of angular positions; and detection of the current angular position of said measuring unit at rotation of said rotary components, by means of a gyro arranged in at least one of said measuring units.

According to one embodiment, the invention comprises detection of the current angular position of said first measuring unit and the second measuring unit, respectively, at rotation of said rotary components when they are arranged with essentially horizontal orientation; by means of an accelerometer arranged in at least one of said measuring units; and detection of the current angular position of said first measuring unit and the second measuring unit, respectively, at rotation of said rotary components when they are arranged with essentially vertical orientation, by means of said gyro.

Furthermore, according to one embodiment the invention can comprise detection of whether said rotary components are arranged with horizontal or vertical orientation, by means of an accelerometer in at least one of said measuring units.

It is an advantage of the invention that it allows a flexible alignment which is in particular independent of whether the rotary components are arranged along a horizontal or vertical axis of rotation. It is a further advantage of the invention that the aforementioned display unit may be set to show a graphical representation of the rotary components which is adapted in dependence of whether the components are horizontally or vertically arranged. This also entails advantages in terms of increased user friendliness and simplicity in an alignment process.

BRIEF DESCRIPTION OF THE FIGURES

The present invention will now be described in detail with reference to the accompanying drawings, where.

DESCRIPTION OF EXEMPLARY EMBODIMENTS

Figure 1:
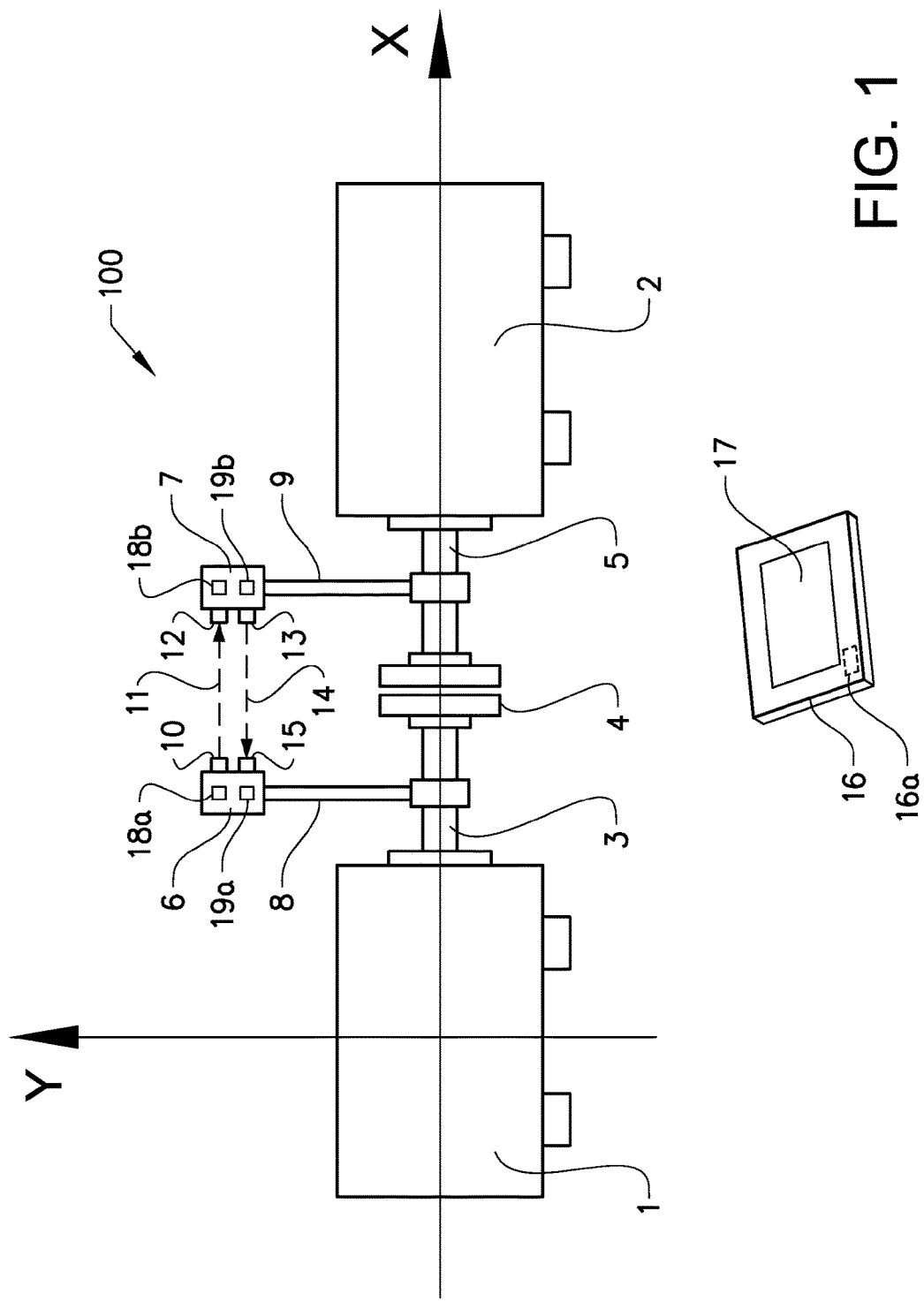
FIG. 1 shows a setup of physical components connected to measuring units and the display unit according to the present invention.

FIG. 1 shows a setup 100 of a first component 1 and a second component 2 where the first component 1 is a driving unit, such as, for example, a motor, and the second component 2 is driven by the first component 1 and is, for example, a pump or a generator. The invention is not limited to use with a motor and a pump, but can be used for other types of measurings of relative positions between a first rotary component 1 and a second rotary component 2 under various operating conditions.

The measured output power of the first component 1 is transmitted to the second component 2 via an output shaft 3 of the first component 1, a coupling 4, and an input shaft 5 of the second component 2. The output shaft 3 and the input shaft 5 are each provided with measuring units 6 and 7 for measuring and aligning the output shaft 3 of the motor 1 relative to the input shaft 5 of the pump 2. In particular, the alignment can be assessed by determining any occurring angular errors and the offset values of the two shafts 3, 5. The measuring units 6, 7 are mounted on the first component 1 and the second component 2, respectively, by means of a first mounting device 8 and a second mounting device 9, respectively.

In a preferred embodiment, shown in FIG. 1, the first measuring unit 6 comprises a first light source 10, which is preferably a laser light source arranged to provide a first laser beam 11 directed at the second measuring unit 7. For this reason, the second measuring unit 7 comprises a light detector 12 arranged to detect incident light from the first light source 10. Furthermore, the second measuring unit 7 may comprise a second laser light source 13 to generate a further laser beam 14 intended to be directed at the first measuring unit 6, in particular at a further light detector 15 arranged in said first measuring unit 6 and arranged to detect the position at which the laser beam 14 is incident against the light detector 15. However, said measuring units 6, 7 need not contain both light source and light detector. The advantage of two laser beams is more accurate measurings.

In a further embodiment, the first measuring unit 6 comprises a light source 10, while the second measuring unit 7 comprises a reflector for light from said light source 10, and the first measuring unit 6 comprises a detector 15 for light reflected via said reflector. According to a further embodiment, one of the measuring units may be provided with a light source, e.g. a laser light source, which is adapted for generating light incident on the second measuring unit, which is then provided with a detector unit which in turn is built as two detector elements which are offset longitudinally. In other words, the second measuring unit is provided with a detector unit which can be used for splitting up the incoming light beam and at the same time detecting the position in which the light beam is incident on respective detector elements. This can be used for simultaneously determining the position and angle of incidence of the light beam if the two detector elements are axially offset, i.e. along the same direction as the direction of the light beam. Thus, the invention encompasses several different variants of measuring units with associated light sources and detectors.

According to a further embodiment, the invention can comprise a detector in the form of an image sensor, e.g. in the form that can be fitted in a camera. This image sensor is then arranged on a measuring unit and is adapted for sensing the position of a graphical image, a pattern, or other graphical information, which is then displayed on the opposite measuring unit.

FIG. 1 further shows a mobile display unit 16 according to the present invention. The display unit 16 is preferably connected to at least one measuring unit 6, 7 via a wireless connection, such as IEEE 802.11 type or Bluetooth. A wireless connection makes the display unit 16 easily movable around the setup 100. The connection can also be a physical connection, such as an EIA-485 coupling or an EIA-422 coupling, to at least one measuring unit 6, 7. The display unit is preferably of such a size that a user (not shown in the figure) of the display unit 16 can hold it in his hand.

The display unit 16 has a display 17, such as an LCD screen with full VGA resolution. The display 17 shows graphical information which symbolically represents the setup of the physical components 1, 2 relative to each other. The graphical information is suitably in the form of three-dimensional views of the setup 100 with images of its main constituent parts, seen from a specific given viewing angle. The display 17 may also be arranged to display numerical or other information regarding for example the dimensions of the components 1, 2, or other measures that are relevant for the alignment of the components 1, 2 relative to each other.

The display unit 16 has a control unit 16a which is adapted for receiving data on the positions of the components 1, 2, data on the dimensions of the components 1, 2 and the shafts 3, 5, and other constituent parts of the setup 100, as well as relevant spacing between different parts of the setup 100. The control unit 16 is a suitable processor. The control unit 16a specifies, among other things, how alignment errors are to be computed and what graphical information is to be displayed.

The measuring units 6, 7 comprise a wireless or physical connection to the control unit of the display unit 17. The measuring units 6, 7 further comprise at least one motion sensor. The motion sensor can be an accelerometer or a gyro. An accelerometer is a type of motion sensor which emits an electrical signal which is proportional to the speed change, acceleration, the sensor is exposed to. It is also able to sense gravity, which makes it usable as position sensor. In the embodiment, the accelerometer is used as position sensor, i.e. it senses the direction in which the measuring units are located relative to the direction of gravity. By means of this measuring with the accelerometer, one can obtain a value of the angular position of the measuring unit when the setup is in the horizontal position. You then get the function of an inclinometer which gives an absolute value of the angular position of each measuring unit 6, 7 at rotation about each shaft 3, 5. The accelerometer sends this user information to the display unit 16 for graphical presentation.

FIG. 1 shows schematically a first gyro 18a and a first accelerometer 19a in the first measuring unit 6, and a second gyro 18b and a second accelerometer 19b in the second measuring unit 7. Thus, it can be established that the horizontally oriented setup 100 in FIG. 1 utilizes the first accelerometer 19a in the first measuring unit 6 for an angular measuring. i.e. for detecting an absolute value of the angle of rotation of the first measuring unit 6. The determination of the angle of rotation is repeated in a plurality, e.g. three, different angular positions and is used together with the position information from the measuring units 6, 7 for the computation of any occurring angular errors and offset errors of the shafts 3, 5.

In case the accelerometer 19a is constituted by a so-called two-shaft accelerometer, it can be used for detecting whether the entire setup, including the units 1, 2, are inclined relative to the horizontal plane. This means that the invention according to such embodiment may be used for determining the current orientation of the measuring arrangement, i.e. whether it is horizontally or vertically oriented, or whether it is oriented with some other—in principle arbitrary—angle of inclination relative to the horizontal plane.

The measuring units 6, 7 may also comprise both a gyro unit and an accelerometer measuring the direction of movement and orientation of the measuring units 6, 7 as they are moved by rotation.

The measuring unit 6, 7 is arranged to adopt a plurality of different rotational positions on the first rotary shaft 3 and the second rotary shaft 5, respectively, during measurings to obtain measurement values related to the positions of the first rotary shaft 3 and the second rotary shaft 5.

Figure 2:
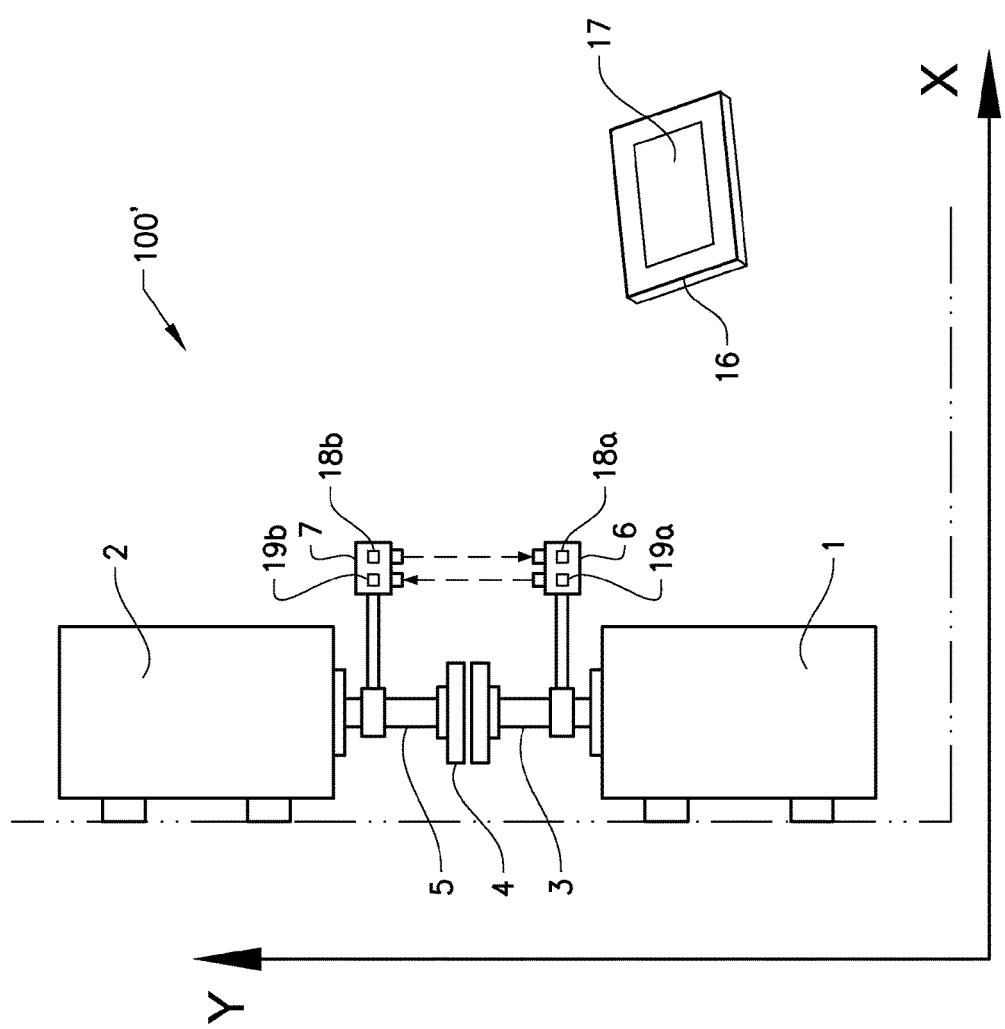
FIG. 2 shows a setup corresponding in principle to FIG. 1, but in which the components are arranged essentially vertically.

FIG. 2 shows a setup 100', which corresponds, in principle, to what is shown in FIG. 1, but which is arranged essentially vertically, i.e. with the rotary shafts 3, 5 arranged essentially along a vertical plane. The components in FIG. 2 corresponding to like components according to FIG. 1 have the same reference numerals.

In the setup according to FIG. 2, an accelerometer 19a in the first measuring unit 6 cannot be used for detecting specific angular values of the rotation of the first measuring unit 6 as the latter rotates only in the horizontal plane. Instead, respective gyro 18a, 18b can then be utilized to generate information on the angular position of the respective measuring unit. More specifically, the respective gyros 18a, 18b will be used for detecting the relative angle relative to a reference value (which the user can select and set). In summary, the gyro 18a, 18b can be used for detecting a change in direction, i.e. in this case the angle, at rotation of the measuring unit about the axis of rotation of the respective shaft 3, 4. A value of the angular position of the respective measuring unit in a number of rotational positions can then be fed to the control unit 16 to allow computation of any occurring angular errors and offset errors.

Commercially available accelerometers and gyros are available as one-, two- and three-shaft models. The variants used according to the invention are preferably of the three-shaft type, which entails, for example, that a setup with both gyro and accelerometer (of the three-shaft type) can be used for sensing the angular position of the respective measuring unit in both horizontal and vertical orientation of the respective setup 100, 100.

Furthermore, the use of an accelerometer can give a signal to the display unit 16 indicating whether the setup 100, 100 is oriented vertically or horizontally. Additionally, the setup may also be oriented with a different angle than completely vertical (as shown in FIG. 2), i.e. where the entire setup 100' (cf. FIG. 2) can be said to be oriented along a line having a certain angle relative to the horizontal plane. This entails, in turn, an advantage of the invention, since the graphics displayed on the display unit 16 can then be adapted such that the graphical images of each setup presented on each display 17 corresponds to how they look in reality.

It should also be noted that the principles of the invention may be implemented if just one of the measuring units includes accelerometer and gyro. This presupposes that the coupling 4 (cf. FIGS. 1 and 2) which connects the two rotary shafts 3, 5 does not exhibit any apparent play, but that it constitutes a firm connection where the shafts 3, 5 do not move relative to each other during the measuring.

The display unit comprises an orientation device for determining the orientation of the system for further graphical presentation.

In a basic form, the invention is based on at least one of the measuring units 6, 7 comprising a gyro that can be utilized for angular determination, more particularly a detection of the current angular position of the measuring unit at rotation of the two shafts 3, 5. According to one embodiment, an accelerometer can also be used so that the gyro may be used for angular determination when the shafts are vertically oriented, and the accelerometer can be used for angular determination when the shafts are horizontally oriented.

Figure 3B:
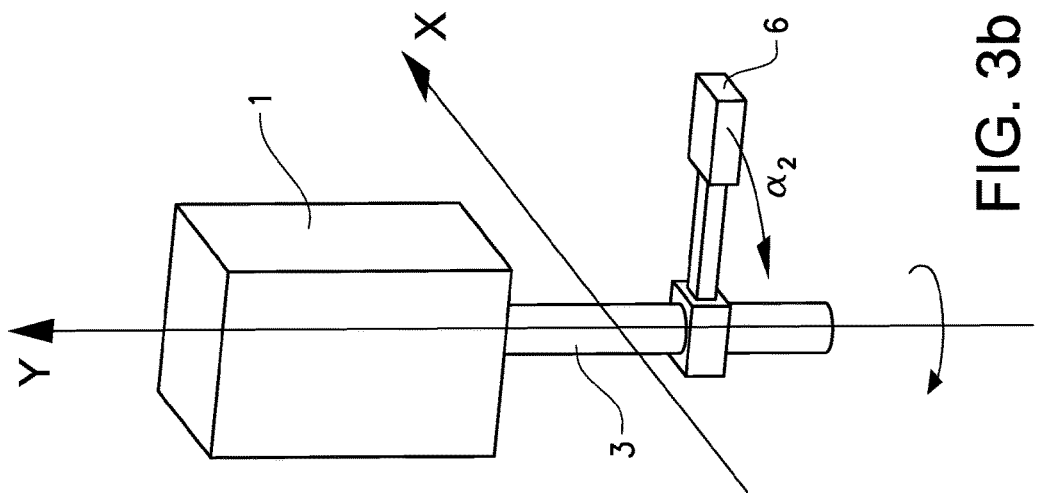
FIGS. 3a-3b show a setup of physical components in different orientations, horizontal and vertical, respectively.
Figure 3A:
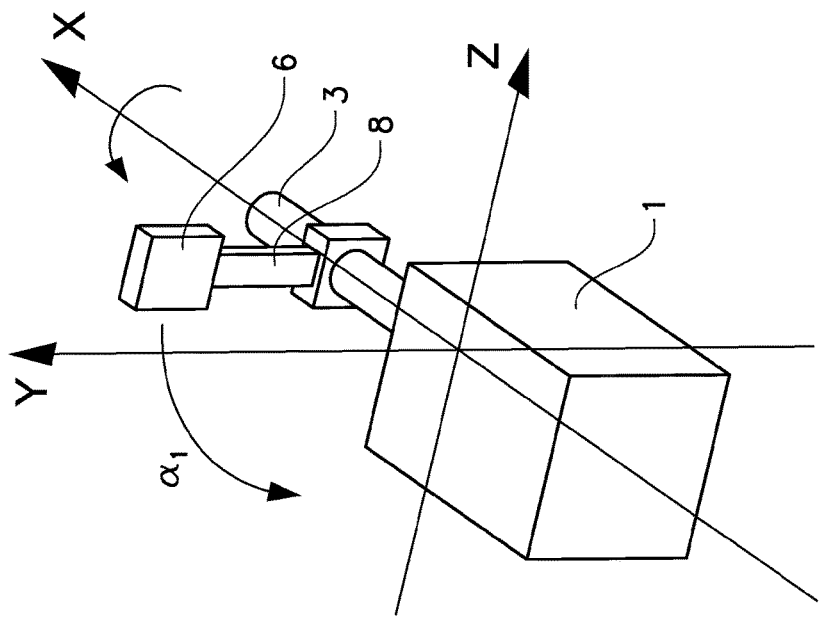

FIG. 3a shows a setup of a first component 1 and a measuring unit 6 in the horizontal orientation in a coordinate system, i.e. the first component and likewise the second component (not shown) are in this case arranged along an essentially horizontal shaft which in FIG. 3a corresponds to the x-axis. Said first component 1 represents zero value on the x-axis. The accelerometer 18a (cf. FIG. 1) may then be arranged to register data on acceleration in the y-axis direction (which corresponds to a certain rotation about the x-axis) and to send those data to the control unit.

According to the embodiment, the first measuring unit 6 also comprises a gyro 18a. A gyro is a type of sensor that senses a change in rotational position. The gyro 18a arranged in the first measuring unit 6 can then—together with the accelerometer 19a in the first measuring unit 6—be utilized for determining a current angular position of the first measuring unit 6 in the direction of rotation, which is more precise than if only the accelerometer 19a is used. So this is an advantage of using a first measuring unit 6 comprising both an accelerometer 19a and a gyro 18a, as they can then be adapted for accurate detection of the current angular position at rotation of the rotary shafts 3, 5 when these are arranged with essentially horizontal orientation as shown in FIG. 1. Also the second measuring unit 7 may comprise an accelerometer and a gyro 19b, 19b for accurately detecting the position of the second measuring unit 7 in the direction of rotation.

The longitudinal direction of the setup 100 is shown in FIG. 3a in a coordinate system in the form of the longitudinal direction of the x-axis. The longitudinal direction of the measuring unit 6 is thus perpendicular to the x-axis, which is the geometrical position data of the measuring unit for its starting position.

At further measuring, the measuring unit 6 will be rotated in the direction of rotation of the shaft 3. For example, the measuring unit 6 will in a second position adopt a rotational position with a specific angle $\alpha 1$ relative to the y-axis. This position can be sensed by means of the accelerometer 19a arranged in the measuring unit 6, which is therefore used in this case as a tilt sensor. Any additional rotational positions of the first measuring unit 6 can also be detected and recorded by means of the accelerometer 19a. Information on measured rotational positions is transmitted onto the control unit 16a. Thus, the accelerometer 19a is used for generating absolute values of the angular position of each measuring unit.

FIG. 3b shows the layout of a first component 1 and a measuring unit 6 in vertical orientation in a coordinate system. The gyro may be set up to register rotation about the y-axis and to send these data to the control unit.

The gyro is given a starting position from which it registers angular changes. Via user information to the display unit 13, the user indicates when the measuring unit 6 is in the starting position. This user information is converted to graphical information in the display unit, which is reproduced as a three dimensional image of the setup from a view and a perspective corresponding to how a user (who is holding the display unit) is actually viewing the setup.

The longitudinal direction of the setup 100 is shown in FIG. 3b in a coordinate system in the form of the longitudinal direction of the y-axis. The longitudinal direction of the measuring unit 6 is thus perpendicular to the x-axis, which is the geometrical position data of the measuring unit for its starting position.

At continued measuring, the measuring unit 6 will be moved in the direction of rotation of the shaft 3. For example, the measuring unit 6 will in a second position adopt a rotational position with a specific angle $\alpha 2$ relative to the y-axis. This position can be sensed by means of the gyro unit 19a arranged in the measuring unit 6 as the accelerometer 18a in the measuring unit 6—which is utilized for sensing the inclination of the measuring unit 6 relative to the horizontal plane—cannot be used for sensing said angular position $\alpha 2$. On the other hand, the gyro unit 19a can be used in this position for detecting the direction of rotation of the measuring unit 6 about the y-axis. Thus, the angular position $\alpha 2$ of this first rotational position and any further rotational positions of the first measuring unit 6 can be detected and registered by means of the gyro unit 19a. Information on measured rotational positions is transmitted onto the control unit 16a.

It should be noted that information on current rotational positions also of the second measuring unit 7 is transferred to the control unit 16a in connection with measurings, i.e. with the components 1, 2 oriented in, for example, horizontal or vertical direction. Analogously to what is stated above, this information is generated by means of the accelerometer 18b and the gyro unit 19b in the second measuring unit 7.

According to one embodiment, information on rotational positions α1, α2 is generated and transmitted from the respective measuring unit 6, 7 no matter whether the associated components 1, 2 are oriented in the horizontal or vertical direction. The invention can also be used for detecting the current orientation of said first measuring unit 6 and the said second measuring unit 7, respectively. The invention can also be used, in principle, if the components 1, 2 in question are oriented "inclined", i.e. along in principle arbitrary angles relative to the horizontal plane.

The invention is not limited to the above embodiments and examples, but is limited by the scope of the following claims.

As mentioned above, the graphical presentations displayed on the display unit 16 can be adapted to the measurement values obtained from accelerometer and gyro, respectively, i.e. they can be adapted to e.g. the orientation of the rotary components to be aligned. In this way, a lifelike reproduction of the constituent components can be displayed on the display unit.

Furthermore, it is noted that the display unit 16 shown in FIGS. 1 and 2 may be wireless, or alternatively wired. As a further alternative, the display unit may be built into one of the measuring units 6, 7, or into any other component that belongs to the respective setup 100 of rotary components and measuring equipment.

Furthermore, the principles of the invention can be implemented by arranging an accelerometer and a gyro in a single measuring unit. To achieve this, it is required that the coupling is arranged such that the two rotary shafts 3, 5 are fixedly attached to each other and that they do not exhibit any significant play. Furthermore, said accelerometer and gyro are of the so-called three-shaft type; however, the invention is not limited to this, but can, in principle, be implemented even with one- and two-shaft gyros and accelerometers.

The invention claimed is:

1. A measuring system for measuring the relative positions of a first rotary component and a second rotary component relative to each other, comprising:
    a first measuring unit adapted for mounting on the first rotary component; and
    a second measuring unit adapted for mounting on the second rotary component, the first component comprising an output shaft of a first machine and the second component comprising an input shaft of a second machine, the output shaft and the input shaft arranged essentially along a common axis;
    wherein at least one of said measuring units comprises a detector unit for determining the positions of said rotary components;
    wherein the first measuring unit comprises a first gyro and the second measuring unit comprises a second gyro for detecting the current angular position of each measuring unit at rotation of said rotary components, the first measuring unit further comprising a first accelerometer and the second measuring unit further comprising a second accelerometer,
    at least one of the measuring units comprises a light source and at least one of the measuring units comprises a detector unit for determining the positions of the rotary components,
    wherein the first and second accelerometers are configured to detect an angular position of the rotary components when the rotary components are essentially horizontally arranged and the first and second gyros are configured to detect the angular position of the rotary components when the rotary components are essentially vertically arranged.

2. A measuring system according to claim 1, wherein the measuring system further comprises the first rotary component and the second rotary component.

3. A measuring system according to claim 1, wherein at least one of said measuring units comprises a light source.

4. A measuring system according to claim 1, wherein at least one of the first or second accelerometers is configured to detect whether said rotary components are arranged with vertical orientation.

5. A measuring system according to claim 1, wherein at least one of i) the first accelerometer and the first gyro or ii) the second accelerometer and the second gyro are configured to detect the current angular position at rotation of said rotary components when they are arranged with essentially horizontal orientation.

6. A measuring system according to claim 1, wherein the first measuring unit and the second measuring unit are adapted, at measuring, for adopting a plurality of different rotational positions on said rotary components to obtain the measurement values related to the positions of said rotary components.

7. A measuring system according to claim 1, wherein the first measuring unit comprises a light source; that the second measuring unit comprises a detector for light from said light source; that the second measuring unit comprises a second light source; and that the first measuring unit comprises a detector for light from said second light source.

8. A measuring system according claim 7, wherein said light sources are constituted by laser light sources.

9. A measuring system according to claim 1, wherein the first measuring unit comprises a light source; that the second measuring unit comprises a reflector for light from said light source; and that the first measuring unit comprises a detector for light reflected via said reflector.

10. A measuring system according to claim 1, wherein the first measuring unit comprises a light source, and that the second measuring unit comprises a detector with at least two longitudinally spaced detector elements for simultaneous detection of the position and angle of incidence for light from said light source.

11. A measuring system according to claim 1, wherein said a first measuring unit comprises a detector unit which is constituted by an image sensor adapted for sensing the position of a graphical image, a pattern, or other graphical information which is displayed on the second measuring unit.

12. A measuring system according to claim 1, wherein it comprises a display unit for display of graphical information which reproduces a setup of the first component and the second component.

13. A measuring system according to claim 12, wherein said display unit is arranged for adapting said display of said graphical information in dependence of the orientation of the measuring units.

14. A measuring system according to claim 12, wherein said display unit is mobile and wirelessly connected to said measuring units.

15. A method of measuring the relative positions of a first component and a second component relative to each other, the first component comprising an output shaft of a first machine and the second component comprising an input shaft of a second machine, the output shaft and the input shaft arranged essentially along a common axis, the method comprising the steps:
   mounting of a first measuring unit on a first rotary component, the first measuring unit including a first accelerometer and a first gyro; and
   mounting of a second measuring unit on a second rotary component, the second measuring unit including a second accelerometer and a second gyro, wherein at least one of said measuring units comprises a detector unit for determining the positions of said rotary components,
   wherein the first rotary component and the second rotary component are arranged generally along a common axis, and
   at least one of the measuring units comprises a light source and at least one of the measuring units comprises a detector unit for determining the positions of the rotary components,
   wherein the method comprises the steps:
      rotating said rotary components for setting said rotary components in a plurality of angular positions; and
      detecting of the current angular position of each measuring unit at rotation of said rotary components, by means of the first accelerometer arranged on the first measuring unit and the second accelerometer arranged on the second measuring unit when the rotary components are essentially horizontally arranged, and by means of the first gyro arranged in the first measuring unit and the second gyro arranged in the second measurement unit when the rotary components are essentially vertically arranged.

16. A method according to claim 15, further comprising: detecting whether said rotary components are arranged with vertical orientation, by means of at least one of the first accelerometer or the second accelerometer.

17. A method according to claim 15, further comprising: generating light in at least one of said measuring units; and
detecting said light in the second of said measuring units.

18. A method according to claim 15, further comprising: displaying graphical information on a display unit which reproduces a setup of the first component and the second component.

19. A method according to claim 18, further comprising: adapting said display of graphical information in dependence of the orientation of the measuring units.

* * * * *